W. PHELPS.
Car Axle.
No. 29,001.
Patented July 3, 1860.
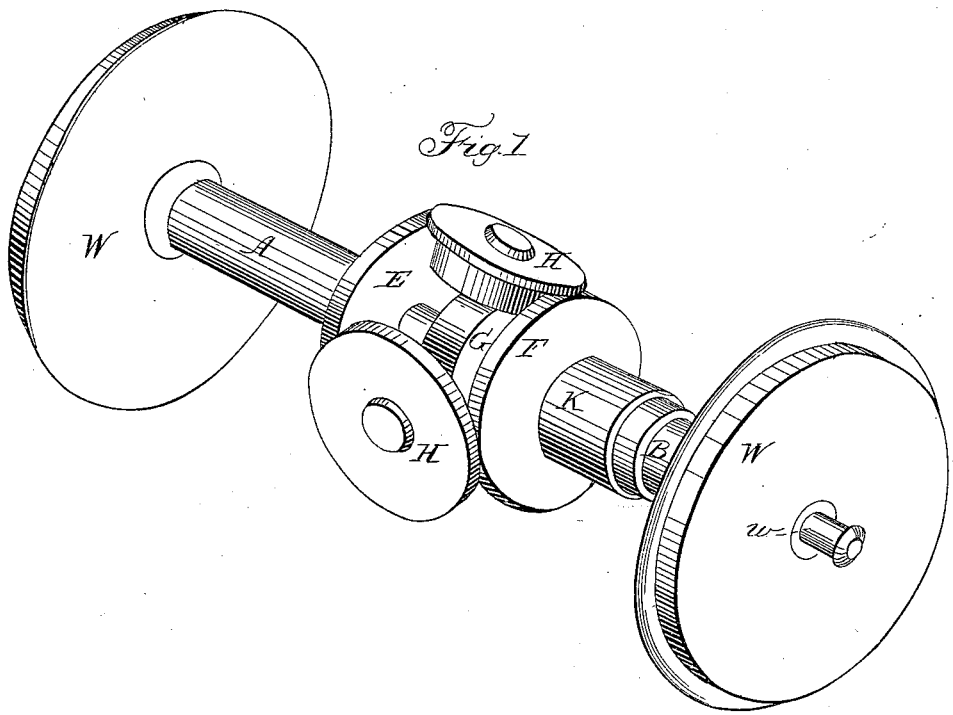
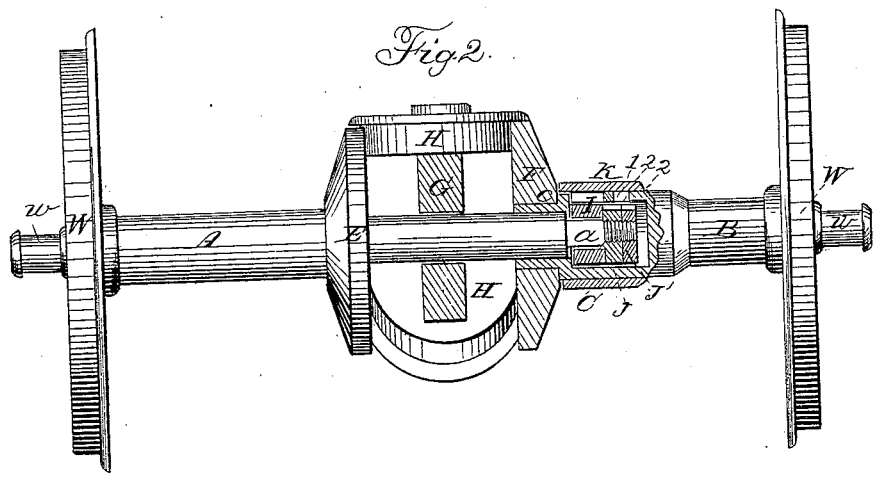
Witnesses;
James H. Gridley
Inventor;
Knight Brothers Attys
For William Phelps

UNITED STATES PATENT OFFICE.

WILLIAM PHELPS, OF SYCAMORE, ILLINOIS.

CAR-AXLE.

Specification of Letters Patent No. 29,001, dated July 3, 1860.

*To all whom it may concern:*

Be it known that I, WILLIAM PHELPS, of Sycamore, Dekalb county, Illinois, have invented a new and useful Improvement in Car-Axles; and I hereby declare the following to be a full and exact description of the same, reference being had to the accompanying drawings, making part of this specification.

My invention relates to axles which are swiveled so as to allow the wheels to rotate independently and consists in an improved device combining great strength with great freedom of motion.

In the accompanying drawings Figure 1 is a perspective view of my improved axle with wheels attached. Fig. 2 is an elevation of the same partly in section.

A and B represent the two parts of the axle, to each of which is secured a wheel W. *w* represent the journals.

The portion B of the axle is formed with a box C receiving the end of the portion A which is secured therein as will be hereinafter explained.

E, F, are two parallel disk plates the former of which is rigidly secured to the axle A and the latter to the box C.

G is a yoke journaled on the axle A between the plates D and E and having on its periphery rollers H which are gripped between the said plates. The end *a* of the axle which fits in the box or coupling is squared and a screw thread cut thereon. I is a washer fitting the square *a*, and bearing against a shoulder *c* within the box C.

J is a nut bearing against the washer I and J' a check nut.

1 represents a slot in the box C and 2, grooves in nuts I and J for the insertion of a key to tighten or withdraw the said nuts.

K is a loose sleeve secured upon the box C to retain oil and exclude dirt.

It is preferable to construct the rollers H with flanges engaging over the peripheries of the disk plates D and E as shown to hold the parts in proper position, resist any sudden concussion, protect the central portion of the shaft from undue strain and increase the strength and rigidity of the axle.

By the above described device the bearings at the peripheries of the plates D and E afford strength and rigidity exceeding those of a solid axle and at the same time maintain the most perfect freedom of motion.

I claim as new and of my invention herein:

The swiveled axle A B, disk plates D and E, yoke G and rollers H, constructed and combined substantially as and for the purposes set forth.

In testimony of which invention, I hereunto set my hand.

WILLIAM PHELPS.

Witnesses:
 OCTAVIUS KNIGHT,
 JAMES M. LINDLEY.